United States Patent
Meller et al.

(10) Patent No.: US 9,080,791 B1
(45) Date of Patent: Jul. 14, 2015

(54) DOCKING AND LOCKING SYSTEM FOR SOLAR PANEL CLEANING SYSTEM

(71) Applicant: ECOPPIA SCIENTIFIC, LTD., Tel Aviv (IL)

(72) Inventors: Moshe Meller, Tel Aviv (IL); Eran Meller, Tel Aviv (IL)

(73) Assignee: Ecoppia Scientific, Ltd., Tel Aviv (IL)

( * ) Notice: Subject to any disclaimer, the term of this patent is extended or adjusted under 35 U.S.C. 154(b) by 0 days.

(21) Appl. No.: 14/266,207

(22) Filed: Apr. 30, 2014

(51) Int. Cl.
*A47L 11/38* (2006.01)
*F24J 2/46* (2006.01)
*B08B 1/00* (2006.01)

(52) U.S. Cl.
CPC .............. *F24J 2/461* (2013.01); *B08B 1/008* (2013.01); *F24J 2/4607* (2013.01)

(58) Field of Classification Search
CPC ........... F24J 2/461; F24J 2/4607; A47L 11/38
USPC ............. 15/97.1, 246, 250.001, 250.22, 102, 15/103
See application file for complete search history.

(56) References Cited

U.S. PATENT DOCUMENTS

| | | | |
|---|---|---|---|
| 6,328,813 B1 | 12/2001 | Dornier | |
| 8,240,320 B2 | 8/2012 | Mertins et al. | |
| 8,323,421 B2 | 12/2012 | Lee | |
| 8,468,755 B2 * | 6/2013 | Zuritis | 52/173.3 |
| 8,500,918 B1 | 8/2013 | Meller et al. | |
| 8,771,432 B2 * | 7/2014 | Meller et al. | 134/56 R |
| 2002/0066473 A1 | 6/2002 | Levy et al. | |
| 2006/0048800 A1 | 3/2006 | Rast et al. | |
| 2006/0050929 A1 | 3/2006 | Rast et al. | |
| 2007/0006408 A1 | 1/2007 | Yu | |
| 2008/0236571 A1 * | 10/2008 | Keshner et al. | 126/623 |
| 2011/0162297 A1 | 7/2011 | Roelofsen | |
| 2013/0206173 A1 * | 8/2013 | Zijlstra | 134/6 |
| 2013/0247962 A1 * | 9/2013 | Sakai et al. | 136/248 |
| 2013/0305474 A1 | 11/2013 | Meller et al. | |
| 2013/0306106 A1 | 11/2013 | Meller et al. | |

FOREIGN PATENT DOCUMENTS

| | | | | |
|---|---|---|---|---|
| DE | 10 2010 006531 A1 | 8/2011 | | |
| JP | 5787562 A | 6/1982 | | |
| JP | 2004186632 A * | 7/2004 | ............ | H01L 31/042 |

(Continued)

OTHER PUBLICATIONS

Kobayahi, Tomoo, English Translation of Patent JP2004186632, Jul. 2004.*

(Continued)

*Primary Examiner* — Monica Carter
*Assistant Examiner* — Michael Jennings
(74) *Attorney, Agent, or Firm* — Brown Rudnick LLP

(57) ABSTRACT

Solar panels row cleaning system that can dock and lock itself at a docking extension attached to the solar row. The self-docking and self-locking is optimally used when the cleaning system is not working. Movement of a cleaning apparatus of the cleaning system is controlled to cause an anchoring element on the cleaning apparatus to engage with an anchoring element on the docking extension when in the docking position and thereby lock the cleaning apparatus preventing its movement in horizontal and downward directions. This is particularly useful when strong wind gusts are present.

12 Claims, 11 Drawing Sheets

(56) References Cited

FOREIGN PATENT DOCUMENTS

WO      WO 2009146753 A1 * 12/2009
WO      WO 2010/090493 A2     8/2010

OTHER PUBLICATIONS

U.S. Appl. No. 13/917,285, filed Jun. 13, 2013, Title: "Solar Panel Cleaning System and Method", First Named Inventor: Moshe Meller.
U.S. Appl. No. 13/751,903, filed Jan. 28, 2013, Title: "Solar Panel Cleaning System and Method", First Named Inventor: Moshe Meller.
U.S. Appl. No. 13/928,923, filed Jun. 27, 2013, Title: "Solar Panel Cleaning System and Method", First Named Inventor: Moshe Meller.
U.S. Appl. No. 14/243,796, filed Apr. 2, 2014, Title: "Descent Control and Energy Recovery System for Solar Panel Cleaning System", First Named Inventor: Moshe Meller.

* cited by examiner

DOCKING AND LOCKING SYSTEM FOR SOLAR PANEL CLEANING SYSTEM

FIELD OF THE INVENTION

The present invention relates to a docking and locking system that horizontally and vertically docks and locks a solar panel cleaning system.

BACKGROUND OF THE INVENTION

The challenges of global climate change and energy security demands have made the development of renewable energy alternatives vital for our future. The use of direct sun radiation on solar panel(s) can potentially produce more than enough energy to meet world needs. As the price of solar power lowers and that of conventional fuels rises, the solar business has entered a new era of worldwide growth.

In order to bring solar technologies one step closer to par with petroleum, efficiency rates must improve.

Solar panel surfaces are made of high quality glass and the efficiency of the renewable energy they generate depends, among other things, on the cleanliness of the glass surfaces. Due to dust and other type of dirt on the solar panel, energy losses, in some cases, can reach over forty percent (40%). As most of solar parks are located in dessert areas where the sun radiation is intensive and the exposure to dusty conditions is high, cleaning the solar panels becomes essential. Currently, existing cleaning processes of solar panels are costly, labor intensive as well as consume high volume of water. Due to shortage of water in desert areas, panel cleaning using water is a major obstacle for the solar industry.

As explained and described in the system described in U.S. patent application Ser. No. 13/917,285 (herein after the "core system"), the mobile cleaning section 136 (see FIGS. 1 and 2 of the '285 application) of the core system moves up a main frame while cylinders 124 are idle and moves down the main frame while the cylinders 124, along with the microfiber elements, rotate and clean the surface of the solar panels.

OBJECT AND SUMMARY OF THE PRESENT INVENTION

Objects of the present invention include providing a system and method that can dock and lock the mobile cleaning system at the end of a cleaning process such that even strong gusty wind will not be able to push the cleaning system from a docking station back to the solar panels array; and to provide such a system that will be operationally effective, cost effective, fail safe, simple to construct, operate and/or use, and maintenance free.

A solar panel row cleaning system with a two directional locking mechanism in accordance with the invention includes a support construction for supporting the solar row, a movable main frame movable in a length direction of the solar row, at least one cleaning apparatus mounted on the main frame and movable in a width direction of the solar row, a first anchoring element attached to the cleaning apparatus, a first actuator for moving the cleaning apparatus in the width direction and a second actuator for moving the main frame in the length direction. A control unit controls the first actuator to cause controlled movement of the cleaning apparatus in the width direction and the second actuator to cause controlled movement of the main frame in the length direction. An extension is attached to the support and includes a second anchoring element.

To provide for the docking and locking of the mobile cleaning system, the cleaning apparatus is movable from an operative position over the solar row to a docking position in engagement with the extension. To this end, the control unit is configured to move the cleaning apparatus to cause the anchoring elements to engage with one another when in the docking position and thereby lock the cleaning apparatus preventing its movement in horizontal and downward directions.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
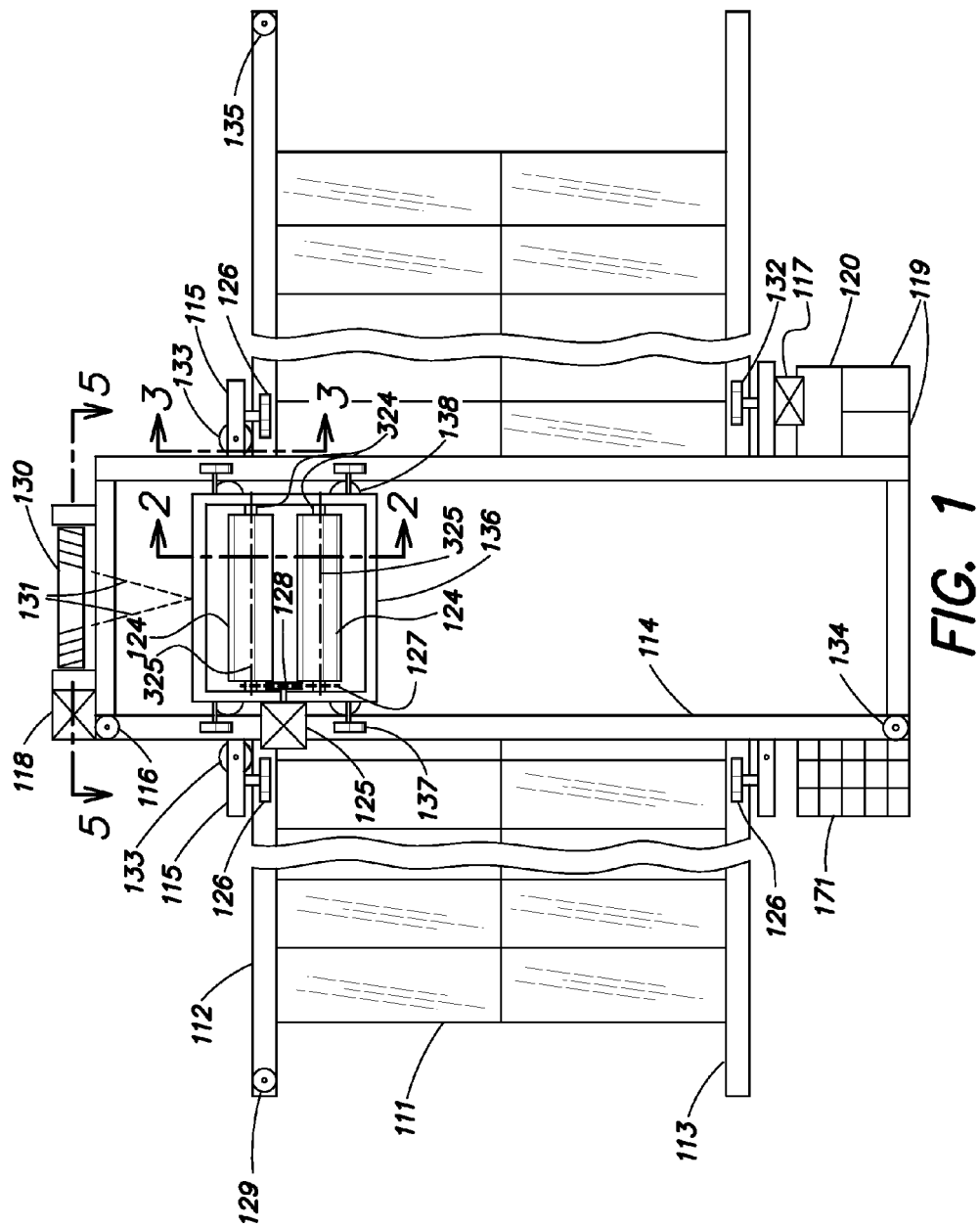
FIG. 1 is a top view of a first embodiment of a solar panel cleaning system in which the invention may be applied.

Referring to the accompanying drawings wherein the same reference characters refer to the same or similar elements, FIG. 1 is a top view of an exemplifying embodiment of a solar panel cleaning system in accordance with the invention, some details of which are omitted for the sake of simplicity and clarity.

An exemplifying solar panel cleaning system is shown in combination with a row of solar panel assemblies 111 (hereinafter referred to as "the solar row"). The solar row 111 comprises a plurality of solar panels of most any type and construction known to those skilled in the art. For example, a single solar panel typically would have a face area less than about one square meter. A length of the solar row 111 can vary between about a few meters to about a few kilometers. A width of the solar row 111 ranges from about one meter to about several meters.

The surface of each solar panel in the solar row 111 is preferably made of transparent material such as glass. The solar panel surface may be coated with a repellent coating that makes the cleaning process of the surface easier.

Figure 2:
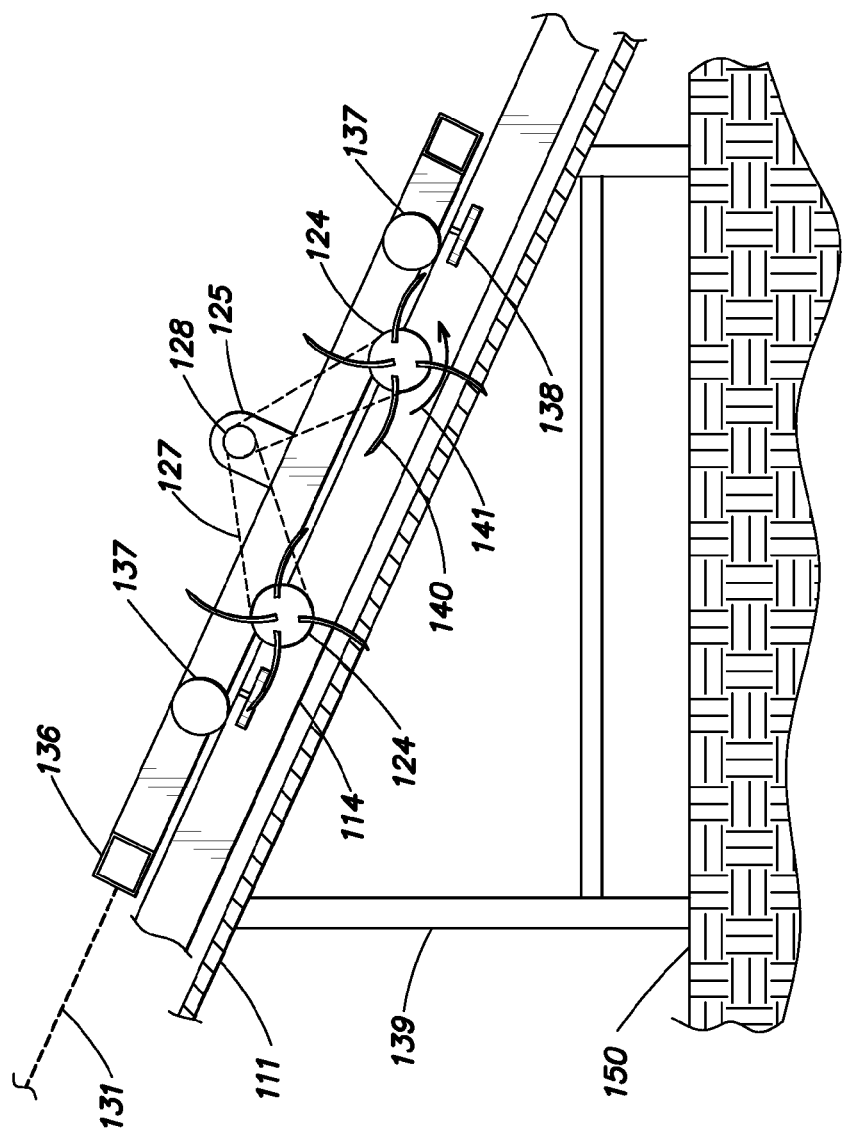
FIG. 2 is a sectional view taken along the line 2-2 in FIG. 1, showing the solar panel cleaning system in a downward motion cleaning the solar panel.

As shown in FIG. 2, the solar row 111 is constructed in an angular or inclined position toward the sun, which creates a lower edge (the rightward edge) and a higher edge (the leftward edge) of the solar row 111.

A pair of parallel rails 112, 113 is connected to the upper edge and the lower edge of the solar row 111, respectively. Rails 112 and 113 may be made from steel, fiberglass or other metallic or non-metallic materials. In some embodiments of the invention, rails 112 and 113 can be used as electricity conductors, i.e., electrical cables may be arranged in an interior of the rails 112, 113 or along an outer surface of the rails 112, 113, or the rails 112, 113 may be made of electrically conducting material and can be used as electrical conductors for the system.

The cleaning system includes a support frame that enables bi-directional movement of a cleaning assembly, described below. This bi-directional movement enables the cleaning assembly to move along the solar row in two directions-along the length of the solar row 111 (left-right in FIG. 1) and in the width direction of the solar row 111. The support frame includes a main frame 114 that is configured to be movable along the length of the solar row 111. Main frame 114 is preferably made from aluminum constructive profiles but other materials such as steel or fiberglass can be used. Supporting elements 115 are connected to the main frame 114 for support, four of which are shown in FIG. 1.

Several wheels having different functions are connected to the main frame 114, there being a total of six such wheels in the illustrated embodiment although the number, function and position of the wheels may vary. These wheels enable the main frame 114 to move along the solar row 111 in the length direction of the solar row. Of these wheels, three wheels 126 support the main frame 114 in a perpendicular direction relative to the surface of the solar panels in the solar row 111 (see FIG. 1). Two other wheels 133 support the main frame 114 in a parallel direction relative to the surface of the solar panels in the solar row 111. Instead of two wheels 133, other amounts of wheels may be used, such as four.

A drive wheel 132 is arranged in the same orientation as wheels 126, i.e., in a perpendicular direction relative to the surface of the solar panels in the solar row 111, and is driven by a drive system 117, such as a motor, in forward and reverse directions. Drive wheel 132 functions to drive the main frame 114 along the solar row in the length direction of the solar row. The motor in drive system 117 may be any type of motor or other system capable of generating a motive force, such as a DC motor. When a motor is present in drive system 117, an encoder is connected to the motor and reads the angular position of the motor. The angular position is converted by a processor into a determination of the location of the cleaning system along the solar row 111. Drive wheel 132 can drive the frame 114 along the solar row in two directions.

A movement limiting sensing device 116, e.g., a limit switch or a sensor, is located on the upper edge of the main frame 114 (see FIG. 1).

A secondary frame 136 is configured to be movable along the main frame 114. When the main frame has a longitudinal axis as shown, the secondary frame 136 may be considered to move longitudinal or in the longitudinal or length direction along the main frame 114. Secondary frame 136 is preferably made from aluminum profiles, although other materials may be used.

Secondary frame 136 supports at least one and preferably a plurality of cleaning apparatus, such as rotational cleaning units or rotational cleaning apparatus 124 (hereinafter referred to as an "RCA"). As shown in FIGS. 1 and 2, the secondary frame 136 supports two RCAs 124. Each RCA 124 is connected to the secondary frame 136 through a respective central shaft 324 and bearings (not shown) to enable the RCAs 124 to rotate on the secondary frame 136. The rotational axis of each RCA is shown in broken lines 325 in FIG. 1.

A drive system 125 is provided to drive the RCAs 124. Drive system 125 may comprise a DC motor, or another type of motor or motive power source may be used. A power transfer system is provided to convey the motive power from the drive system 125 to the RCAs 124 and convert the motive power into rotational force to rotate the RCAs 124. For example, a pulley 128 may be connected to the drive system 125 and belts 127 wound around the pulley 128 and the RCAs 124. There may be one belt 127 wound around each RCA 124 and the pulley 128. The drive system 125 causes the pulley 128 to rotate and the rotation of the pulley 128 causes the belts 127 to move, which in turn causes a shaft of each RCA 124 to rotate. The belts 127 may be made of polyurethane and be round, but other types of belt shapes, such as V belts or timing belts, and other materials may be used.

In a preferred embodiment of the invention, there are two RCAs 124, but the cleaning system in accordance with the invention is equally usable with only a single RCA 124 or with three or more RCAs 124.

Figure 4:
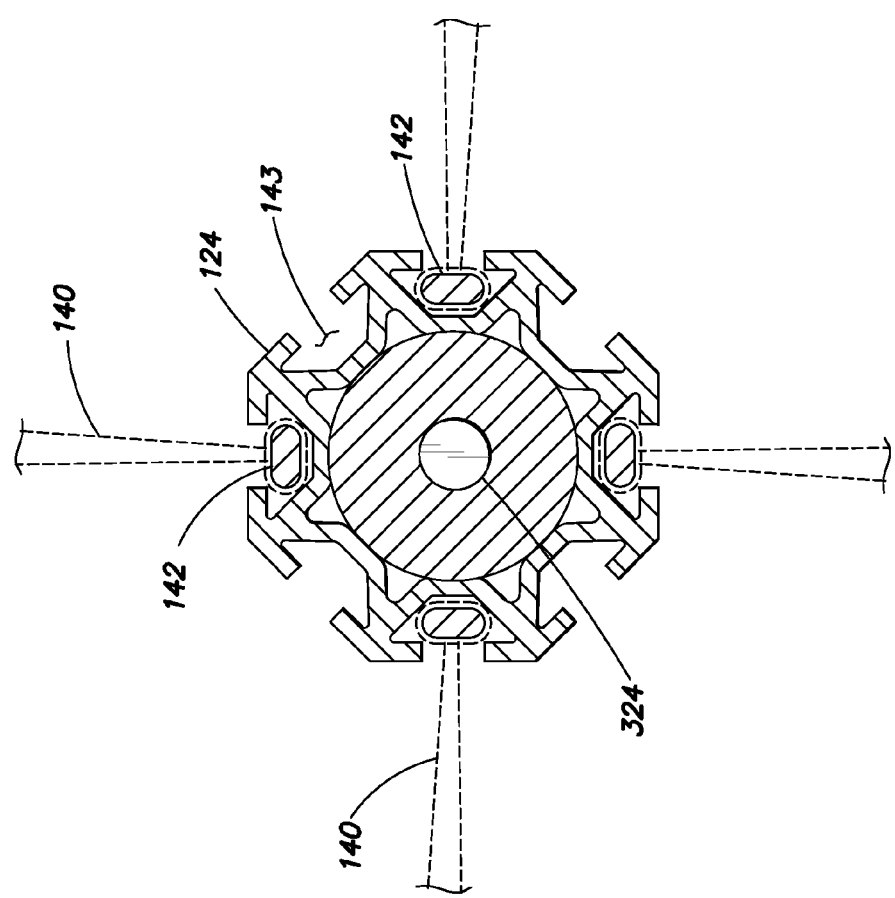
FIG. 4 is a detailed cross-sectional view of the rotating cleaning assembly.

Also, in a preferred embodiment of the invention, the RCAs 124 have roughly octagonal shapes as shown in FIG. 4, but other shapes such as cylindrical, square, hexagonal and any other flat or polygon shapes may be used without deviating from the scope and spirit of the invention.

Referring still to FIG. 4, on the outer surface of each RCA 124, one or more flexible fins 140 are connected via a connection technique to a retaining member of the RCA 124. For example, the fins 140 may be structured to provide a quick connector between the fins 140 and the recesses in the outer surface of the retaining member of the RCA 124. Using a quick connector, of which various types are known to those skilled in the art, periodic cleaning of the fins 140 can be easily implemented by removing them from engagement with the RCA 124, cleaning them and then reconnecting them with the RCA 124. Additional details about the fins 140 and their connection to the RCA 124 are set forth below.

Referring back to FIG. 1, a winch or winch cylinder 130 has one or more cables or ropes (hereinafter referred to as cables for ease of description) 131 attached thereto and partly wound thereon. Rotation of the winch cylinder 130 controls winding or unwinding of the cables 131. This controlled winding and unwinding drives the secondary frame 136 upward along the angular slope of the main frame 114, i.e., longitudinally along the main frame 114. As illustrated, winding of the cables 131 by the winch cylinder 130 causes the upward movement of the secondary frame 136 along the solar panels in the solar row 111, while unwinding of the cables 131 by the winch cylinder 130 causes the downward movement of the secondary frame 136 along the solar panels in the solar row 111 (which is aided by gravitational pull of the secondary frame 136 downward). Winch cylinder 130 is driven by a drive system 118, which may include a DC motor.

The cables 131 are preferably made of a composite material such as KEVLAR® as an outer sleeve, and flexible isolated conductive wire as the inner core inside the sleeve. An outer diameter of each cable 131, i.e., the outer diameter of the outer sleeve, may be about 7 mm. and the diameter of the inner core may be about 4 mm. Other materials, constructions and diameters can be utilized for the cables 131. Additional details about the drive system 118 and the connection of the cables 131 are set forth below.

A power source 119 is provided to power the cleaning system, e.g., one or more batteries that may be rechargeable, replaceable, etc. For example, the power source 119 may provide power to a programmable control unit 120 that controls the operation of the cleaning system, including the operation and movement of the cleaning assembly via the various motors. The power source 119 may itself include a set of solar panels 171 attached to the main frame 114. Solar panels 171 are designed to charge any batteries of the power source 119 during daylight hours and when the solar rays are received by the solar panels 171. The power source 119 and solar panels 171 are attached to the main frame 114 to be movable therewith and thereby allow the cleaning system to operate independently without connection to any other source of electricity (other than that provided by the solar panels 171 and on-board power source 119).

Several sensing devices or sensors are provided in the cleaning system. For example, sensor 129 is positioned on the rail 112 (proximate the left edge in the construction shown in FIG. 1) to detect a maximum leftward movement of the main frame 114 on the rails 112, 113. Similarly, sensor 135 is positioned on the rail 112 (proximate the right edge in the construction shown in FIG. 1) to detect a maximum rightward movement of the main frame 114 on the rails 112, 113. Sensor 129 and/or sensor 135 may alternatively be placed on the rail 113. Sensor 116 is positioned on the main frame 114 (proximate an upper edge in the construction shown in FIG. 1) to detect a maximum upward movement of the secondary frame 136 on the main frame 114. Similarly, sensor 134 is positioned on the main frame 114 (proximate a lower edge in the construction shown in FIG. 1) to detect a maximum downward movement of the secondary frame 136 on the main frame 114.

An encoder of the motor of the drive system 117, when present, transmits limits and position signals to the programmable control unit 120, which allows an effective operation of the system. In some cases, an encoder can replace sensors 129 and 135 by feeding a position of the cleaning assembly corresponding to the positions of sensors 129 and 135. Programmable control units 120 are very well known in the industry and will not be described in detail herein.

FIG. 2 shows details of the secondary frame 136 that is movable downward and upward along the main frame 114, in the width direction of the solar row 111. To provide the solar row 111 with its angularity relative to ground level 150, an angular construction 139 supports the solar row and has a longer vertical riser construction proximate the upper edge of the solar row 111 and a shorter vertical riser construction proximate the lower edge of the solar row 111.

The secondary frame 136 has mounted thereon a plurality of wheels 137, e.g., four wheels, that rotate perpendicularly to the solar panel surface, i.e., their axis of rotation is perpendicular to the normal of the surface of the solar panels in the solar row 111. One or more additional wheels 138, e.g., four wheels, are mounted on the secondary frame 136 to rotate parallel to the solar panel surface, i.e., their axis of rotation is parallel to the normal of the surface of the solar panels in the solar row 111.

Wheels 137, 138 are connected through bearings (not shown) to the secondary frame 136 and roll against the surface of the profiles that make up the main frame 114. Wheels 137 and 138 therefore enable the secondary frame 136 to move upward and downward along the main frame 114. This movement of the secondary frame 136 relative to the main frame 114 and solar row 111 is independent of the movement of the mainframe 114 along the length of the solar row 111.

In the situation shown in FIG. 2, the RCAs 124 rotate in the same direction, counterclockwise as indicated by arrow 141. This direction of rotation preferably occurs as the secondary frame 136 moves downward along the main frame 114. The RCAs 124 are driven by the drive system 125 through the pulley 128 and the belts 127. The belts 127 drive the two RCAs 124 through two additional pulleys (not shown) that are attached to each RCA 124.

Each RCA 124 in FIG. 2 includes four fins 140 that, through a control scheme originated at the drive system 125, rotate at approximately 170 rpm, although other rotational speeds are feasible. While the fins 140 rotate and the secondary frame 136 moves downward, an outer part of the fins 140 touch, sweep and wipe the surface of the solar panels in the solar row 111. Rotation of the fins 140 creates an air blowing effect which helps to push the dirt, debris and the dust on the surface of the solar panels downward as a result of the slope of the solar row 111.

FIG. 2 also shows a connection between the cable 131 that winds and unwinds about the shaft coupled to the winch cylinder 130 (see FIG. 1), and an upper edge of the secondary frame 136, close to a center region of an upper profile that is part of the secondary frame 136. Each cable 131 may be similarly connected to the shaft and secondary frame 136. When the winch cylinder 130 rotates in one direction, the length of the cables 131 between the shaft of the winch cylinder 130 and the secondary frame 136 becomes shorter, and the secondary frame 136 is moved upward. When the winch cylinder 130 rotates in the opposite direction, the length of the cables 131 between the shaft of the winch cylinder 130 and the secondary frame 136 becomes longer and the secondary frame 136 moves downward. An angular condition should be set between a long axis of the winch cylinder 130 and the cables 131, which angle will ensure an orderly winding arrangement of the cables 131 on the winch cylinder 130.

As an alternative, the cables 131 may be connected to the center of the winch cylinder 130 and to two opposite sides of the upper profile of the secondary frame. Preferably, the cables 131 in this configuration would also create an angle between them that allows orderly rolling of the cables 131 on and off the winch cylinder 130.

Instead of the foregoing structure that imparts movement to the secondary frame 136 relative to the main frame 114, other movement systems that enable the secondary frame 136 to move along the main frame 114 are contemplated to be within the scope of the invention. For example, one such alternative includes a system with a timing belt path and a timing pulley that is driven by a gear motor.

Figure 3:
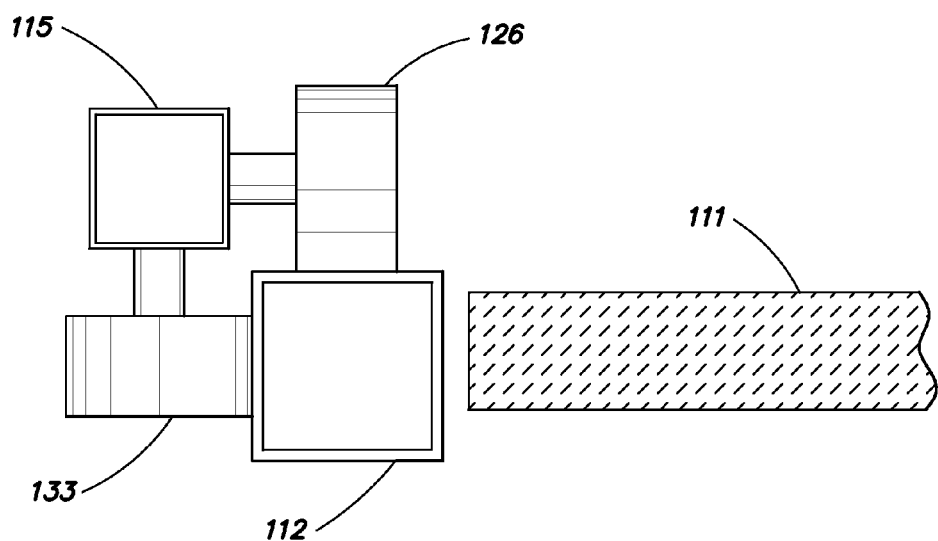
FIG. 3 is a sectional view taken along the line 3-3 in FIG. 1.

FIG. 3 shows the upper rail 112 and supporting element 115 each having a substantially square cross-section, although other shapes are possible. Wheel 126 is mounted on the supporting element 115 to rotate against an upper surface of the rail 112. The axis of rotation of wheel 126 is perpendicular to the normal to the surface of the solar panels in the solar row 111. Wheel 133 is also mounted on the supporting element 115 to rotate against a side surface of the rail 112. The axis of rotation of wheel 126 is parallel to the normal to the surface of the solar panels in the solar row 111. An assembly is formed by the supporting element 115, wheels 126 mounted thereto and wheel 133 mounted thereto. There are three such assemblies, as shown in FIG. 1.

Another assembly includes one of the supporting elements 115, one of the wheels 132 and the drive system 117. These four assemblies enable mobility of the cleaning assembly along the solar row 111 in two directions.

FIG. 4 shows the RCA 124 and the fins 140 connected thereto. As shown in FIG. 4, the RCA 124 preferably has an octagonal shape with eight cavities 143, although, as mentioned before, other polygonal shapes, flat and cylindrical shapes can be provided for the RCA 124.

In a preferred embodiment of the invention, the fins 140 fold around solid center elements 142. The center elements 142 can either be connected to the fins 140 or stand as separate elements. Each fin 140, after being folded around a respective one of the center elements 142, slides into a respective cavity 143 in the RCA 124 and are locked in the cavities 143 by an appropriate locking mechanism. For example, the locking mechanism may comprise at least one flexible side O-ring (not shown).

When the RCA 124 rotates, the fins 140 with their locking elements 142 are pushed toward projections of the cavities 143 by centrifugal force and are locked and rotate along with the RCA 124. Although FIG. 4 shows four fins for the RCA 124, any other number of fins can be used, from one to eight when the octagonal shaped RCA 124 has eight cavities 143.

In a preferred dry cleaning system and method, the fins 140 may be made of fabric. A preferred fabric is microfiber fabrics which are known by professionals for their cleaning and durability qualities. Microfiber fabrics are also very soft and they will not harm the surface of the solar panels. Other fabrics and/or materials are also viable. For a wet cleaning system and method, the fins 140 should be made from different materials and/or fabrics.

Regardless of the type of cleaning system, the fabrics may be coated with silicon, neoprene or other rubber-like materials. In some conditions, combinations of different types of fins can be used. The quick connection capability between the fins 140 and RCA 124, described above, facilitates easy and quick replacement of the fins 140 to enable them to be washed periodically. The preferred quick connection described above is only one manner for connecting the fins 140 to the RCA 124 and additional types of quick connection between the fins 140 and the RCA 124 are also considered part of the invention, such as Velcro strips, zippers and the like.

A length of the RCA 124 and the length of the fins 140 can vary. Preferred sizes of the fins 140 are between about 400 mm, and a preferred length of the RCA 124 is about 1400 mm.

Figure 5:
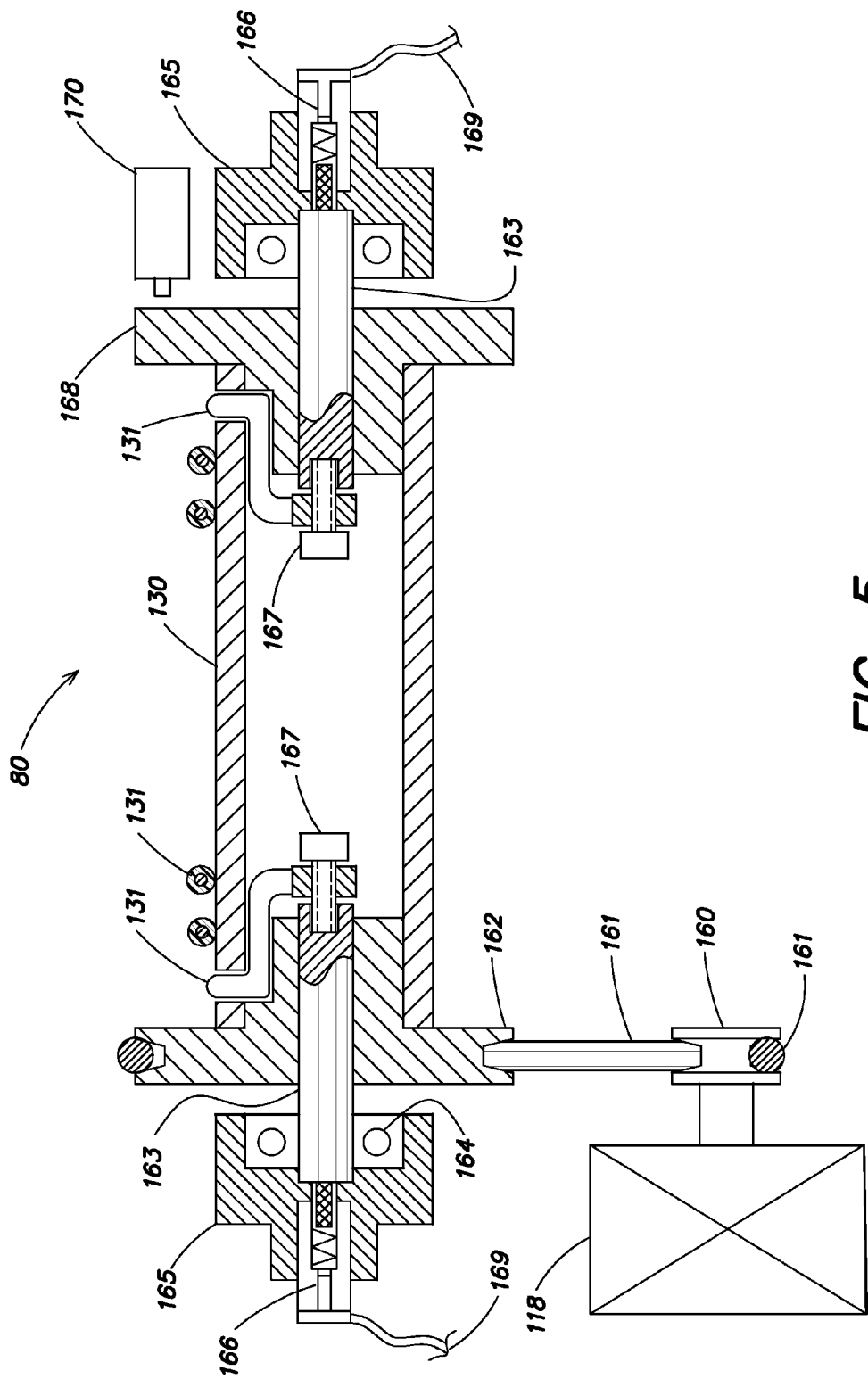
FIG. 5 is a sectional view taken along the line 5-5 in FIG. 1.

FIG. 5 shows an assembly 80 of the winch that includes the winch cylinder 130, and the ropes or cables 131 that wind about the winch cylinder 130 and connect the winch cylinder 130 to the secondary frame 136. As explained above, each cable 131 has conductive inner core and KEVLAR® as an outer sleeve, with other constructions and materials for cables 131 being contemplated by the inventors.

Drive system 118 drives and rotate the winch cylinder 130 through a pulley 160 that receives the motive output of the drive system 118, a belt 161 that passes around the pulley 160 and another pulley 162 that is connected to the winch cylinder 130. Drive system 118 may include a DC motor that can rotate in two directions, i.e., cause clockwise and counterclockwise rotation of the pulley 160. Rotational force can thus be transferred from the drive system 118 to the winch cylinder 130 through a belt or gear reduction. The rotational speed of the winch assembly 80 can be around 100 rpm, although other rotational speeds can be used.

The winch assembly 80 also includes two conductive shafts 163 mounted on respective bearings 164, which in turn are housed partly in and supported by respective two bearing housings 165. Bearing housings 165 are connected to the main frame 114, and more specifically to an upper profile from which the main frame 114 is formed (see FIG. 1). One conductive shaft 163 at one end of the winch cylinder 130 passes through the pulley 162 and the other conductive shaft at the opposite end of the winch cylinder 130 passes through an end disc 168.

Electrically conductive brushes 166 are situated in each of the bearing housings 165 and transmits electricity to the two cables 131 through connectors 167 while the winch cylinder 130 is rotating. Two electrical wires 169 connect the electrically conductive brushes 166 to an electrical power supply through the control unit 120 (see FIG. 1).

In one embodiment, two drive systems 118 are provided. In this case, the end disc 168 is replaced by another pulley, like pulley 162.

A locking mechanism 170 is optionally provided to lock the secondary frame in position. Locking mechanism 170 utilizes a solenoid which when energized, locks the secondary frame 136 in, for example, the upper position while the cleaning system is in a rest mode.

When the control unit 120 gives a command that connects the drive system 118 of the winch assembly 80 to the electricity power supply at a certain polarity, the winch cylinder 130 rotates in a predetermined direction, the cables 131 become shorter and the secondary frame 136 moves upward in the width direction of the solar row. Once the secondary frame 136 reaches the upper end of the main frame 114, the sensor 116 provides a signal to the control unit 120. At this stage, control unit 120 provides the drive system 118 with signals or electrical conditions that causes the secondary frame 136 to move downward, preferably at a predetermined speed, in the width direction of the solar row. These electrical conditions depend on, for example, one or more of the following: an angular position of the solar panel row 111, weight of the secondary frame 136 and the specifications of the RCA 124. The electrical conditions can be one or more of the following: the voltage and the polarity supply to the drive system 118, the operation of a motor of the drive system 118 as a braking generator under short circuit condition, and the operation of the motor of the drive system 118 as a braking generator on specific loads such as power resistor or diodes in any possible configuration. While other arrangements are feasible, two possible configurations include Zener-type diodes or diodes in serial connection.

Another important load arrangement that can control the downward speed of the secondary frame 136 is the connection of the drive system 118, while it operates as a generator, to a special electronic circuit that converts the generating power of the drive system 118 into a sufficiently high voltage that can charge the batteries in the power source 119, to which it is connected in an electrical circuit. This arrangement can reduce the required energy to operate the cleaning system. All of these electrical conditions are designed to control the downward speed of the secondary frame 136 and they are part of the present invention.

When the secondary frame 136 starts its downward motion, the control unit 120 connects the cables 131 to the power supply in a certain polarity that causes the RCAs 124 to rotate at a pre-determined speed and in a desired direction, and thereby clean the surface of the solar panels of the solar row 111.

With respect to more particular details about an exemplifying operation and control of the cleaning system, in any of the embodiments described above, during the vast majority of the time, the system remains in its stationary position with power source 119 connected to and charged by the solar panels 171 (hereinafter this position is referred to as "the home station"). The control unit 120 can trigger a command that will start the system's cleaning process. This command can come from either a preprogrammed schedule or from a command initiated by a control center of the solar panel installation. The solar panel installation may include several solar rows and thus, one cleaning system for each solar row. The solar installation will therefore have several cleaning systems. Optionally, each cleaning system has its own address and location code.

The triggering command is system independent and each system can be autonomous. The control center of the solar panel installation can optionally continuously monitor the output power of the solar row(s) 111 in the installation, the location of each cleaning system and can optionally detect technical problems of any system.

Optionally, the cleaning process can be controlled by a control unit that receives and factors in dynamic information, such as local weather conditions (present and forecast), sand storms and other factors that negatively impact the output power of the solar panels in the solar row 111. These factors can be taken into account in order to trigger the cleaning process, or a schedule for cleaning the solar panels. Such information is typically provided by suitable feeds from various servers connected to the control unit, which are omitted from the description for the sake of simplicity. One skilled in the art would readily understand from the disclosure herein how the control unit would receive and process information of value in determining a cleaning regime for the solar panels in the solar installation and how to implement this regime using the cleaning system described herein, Since the monitoring process can calculate the power output for any given solar row 111, the control unit can be configured by appropriate analysis techniques to detect any broken or stolen solar panel.

When the cleaning system is in its home station, the secondary frame 136 is preferably at the uppermost end of the main frame 114, the main frame 114 at the rightmost position relative to the solar row 111, and the locking mechanism 170 is in a lock position which requires no power. None of the drive systems 117, 118, 125, or motors operate.

Once the cleaning system receives an initiation or start command, the drive system 118 activates the winch cylinder 130, the locking mechanism 170 releases the drive system 118 and the secondary frame 136 starts to move downward. The downward speed of the secondary frame 136 is controlled as explained above. The drive system 125 also starts to rotate and causes rotation of any RCAs 124 coupled thereto, e.g., two in the illustrated embodiment. Rotation of the RCAs 124 causes the fins 140 to rotate to clean the surface of the solar panels in the solar row 111 by pushing the dust, debris and dirt downward. Rotation of the fins 140 also creates an air blowing effect which helps to push and clean the dust, debris and dirt downward along the slope of the solar panels.

Figure 6:
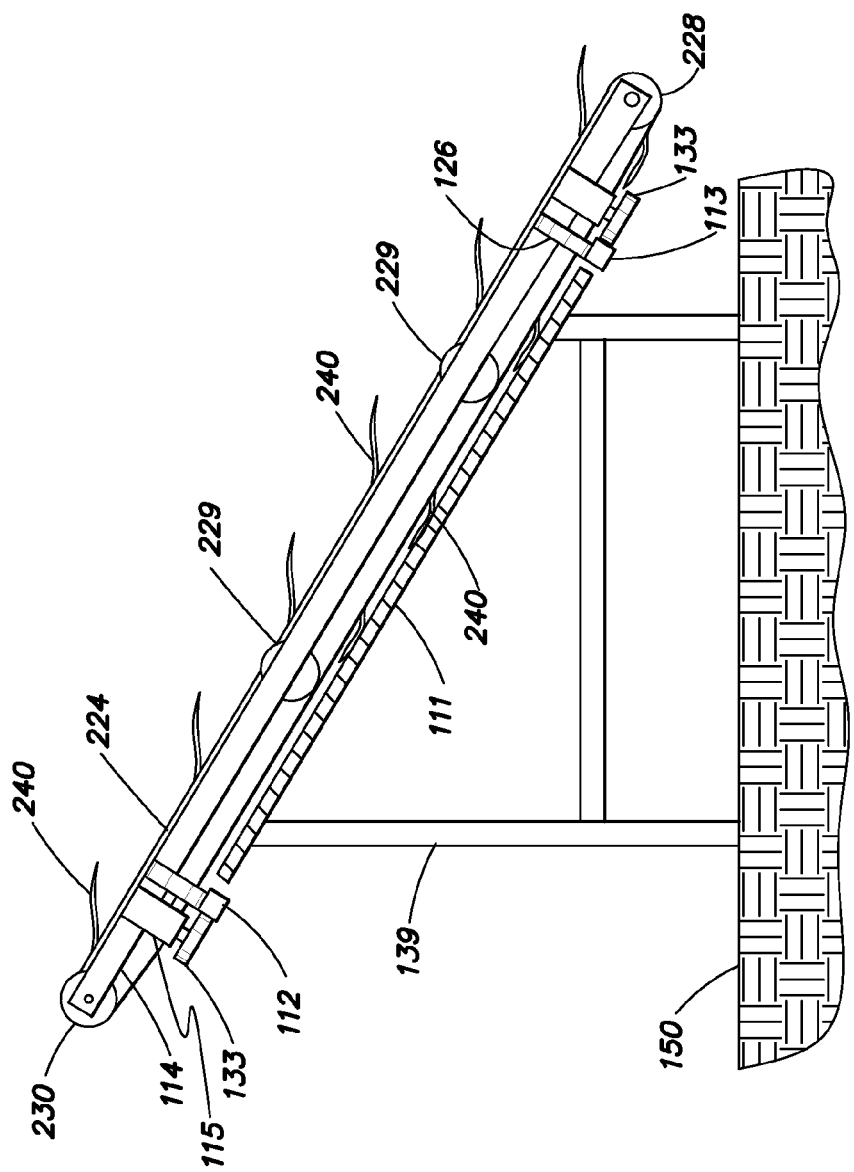
FIG. 6 is a cross-sectional view of a second embodiment of a solar panel cleaning system in which the invention may be applied.

When the secondary frame 136 reaches the lower edge of main frame 114, the sensor 134 transmits a signal to the control unit 120 which is configured to direct, in response to the signal from sensor 134, the drive system 117 starts to rotate initiating motion of the main frame 114 along the length of the solar row in a leftward direction (in the embodiment of FIG. 6). The encoder of a motor in drive system 117 generates pulses during the operation of the motor. After a preset number of pulses, the motor stops by command from the control unit 120. The number of encoder pulses can be correlated to a preset distance along the length of the solar row 111. This preset distance may be equal to the width of the RCAs 124 less a few centimeters to ensure minimal overlap between the cleaning cycles.

During the operation of the drive system 117 and the movement of the main frame 114 along the solar row 111, the drive system preferably continues its operation and RCAs 124 with the fins 140 rotate and perform self-cleaning. When the main frame 114 reaches the preset travel distance, drive systems 117 and 125 stop, and drive system 118 starts rotating the winch cylinder 130 in an upward motion mode and the system starts a new cleaning cycle.

Once the system reaches the end of the length of the solar row, sensor 129 provides a signal and drive systems 117 and 125 stop and the last cycle in this direction starts. Once the last cycle is complete, the system optionally starts a repeating cleaning process in the opposite direction until the system reaches its home station. This repeating cleaning process is optional.

Control unit 120 may be configured to provide any number of different cleaning cycles, with different directions of movement of the secondary frame 136 and main frame 114. It is even possible to implement a control scheme at the control unit 120 wherein there is only a unidirectional cleaning process such that at the end of this process, the system will travel continuously to the home station. Another control scheme is that the cleaning cycle will repeat more than one time.

In some cases, the control unit 120 can cause downward movement of the secondary frame 136 during movement of the main frame 114 along the length direction of the solar row, thereby creating a diagonal cleaning path for the RCAs 124 which are mounted on the secondary frame 136. This diagonal movement is especially advantageous at the last stage of the downward movement of the secondary frame 136 during a cleaning process.

There are also cleaning operations where the end of the cleaning process is initiated by the accumulated distances from the home station and not by the sensor 129. Another possible cleaning operation is to have two cleaning systems at each end of the solar row 111 and a sensor in a middle region of the solar row 111. Each cleaning system can clean part of the solar row 111 and therefore reduce the cleaning duration of a solar row 111 (in half).

Control of the system by the control unit 120, the sensors and the encoder are very well known by professionals in the electronic industry and therefore their description is omitted for the sake of simplicity.

FIG. 6 is a partial cross-sectional, side view of another embodiment of a cleaning system in accordance with the invention. In this embodiment, the secondary frame 136 described above is not present and instead, the cleaning system includes a conveyor belt 224 that has a plurality of fins 240 on its outer surface. The conveyor belt 224 is installed along the main frame 114 and driven by a motorized driving cylinder 228 arranged in a loop of the conveyor belt 224 and at a lower section of the main frame 114.

A tension cylinder 230 is also arranged in the loop of the conveyor belt 224 and at an upper section of the main frame 114. Tension cylinder 230 provides necessary tension to the conveyor belt 224 to enable its movement. Conveyor belt 224 is driven so that its upper section moves upward over the solar panel row 111 in the width direction of the solar row without touching the surface of the solar panels in the solar row 111, while the lower section of the conveyor belt 224 moves downward over the solar panel row 111 and the fins 240 along this lower section touch, sweep, wipe and clean the surface of the solar panel in the solar row 111.

Supporting cylinders 229 are arranged in the loop of the conveyor belt 224 to support the movement of the conveyor belt 224 and the upper section of the conveyor belt 22, i.e., prevent the upper section from coming into contact with the lower section and adversely affecting the operation of the fins 240 along the lower section.

The width of the conveyor belt 224 and the length of its fins 240 can vary. A preferred length of each fin 240 is about 400 mm. A preferred width of the conveyor belt is about 1,200 mm. The fabric and/or the material of the fins 240 is/are identical to those of the fins 140 described above. The fins 240 are connected preferably to the conveyor belt 224 in a quick release connection, similar to that used above to connect fins 140 to the RCAs 124.

Operation of the cleaning system in accordance with this embodiment is similar to that described with reference to the embodiment shown in FIGS. 1-5. Thus, for the vast majority of the time, the cleaning system is in its home station. When a start command is triggered, the driving cylinder 228 is rotated and in turn starts causing the conveyor belt 224 to move. The fins 240 on the lower section of the conveyor belt 224 touch, sweep, wipe and clean the surface of the solar panels in the solar row 111. After a preset travel distance of the conveyor belt 224, which preset travel distance 224 can be determined by data from an encoder attached to the driving cylinder 228, the driving cylinder 228 stops rotating and the main frame 114 travels along the length of the solar row for a preset distance. Then, a new cleaning cycle begins. In all other aspects, the operation and the control of this embodiment of the system are substantially identical to the description provided above with respect to the embodiment illustrated in FIGS. 1-5.

With respect to the power supply for any of the embodiments of the cleaning system described above, the system includes at least one rechargeable battery, preferably a lead, sealed-type battery, although other types of batteries may be used. Regardless of which battery is used, the battery provides the required power supply to the system's drive systems 117, 118, 125, motors thereof and control unit 120 and electronic element.

During daylight while the system is at stationary position, the battery can be recharged by the solar panels 171. These panels 171 can be located in various locations along the system and can be cleaned either by the cleaning system itself, i.e., RCAs 124 or manually. It is essential to emphasize that there are other ways to provide the cleaning system with the necessary power supply. For example, the battery can be charged from an external source such as an existing power grid or the output of the solar farm or solar installation at which the cleaning system is used.

Electricity can also be supplied without the battery. In one such embodiment, electricity can be transferred to the cleaning system through conductive rails and movable connectors similar to the ones used in the train (railroad) industry. All such power supply arrangements are part of the invention.

Figure 7:
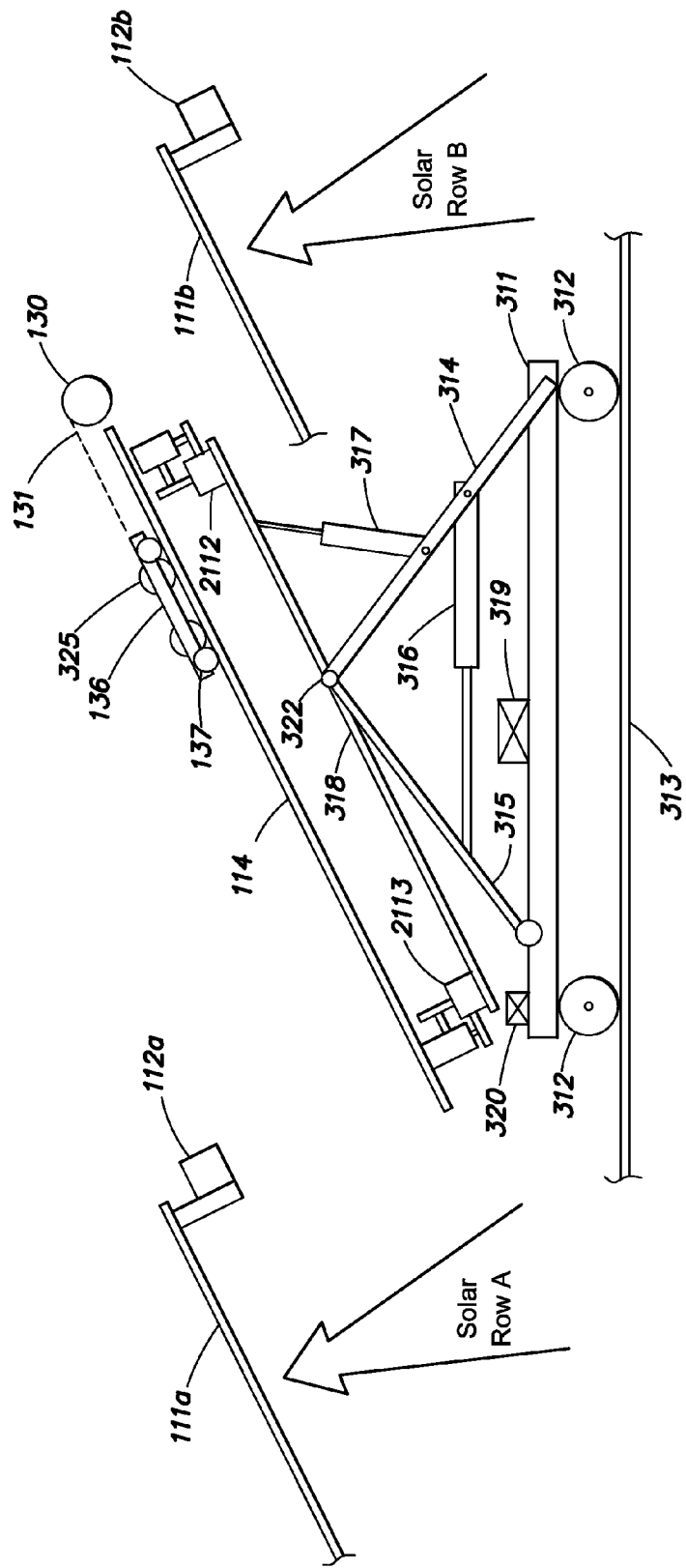
FIG. 7 is a side view of an embodiment in which multiple solar panel rows are cleaned.

FIG. 7 is a side view of an embodiment of the present invention to clean multiple solar panel rows in a given solar park, and two partial side views of solar row A and solar row B of the solar park. Solar rows A and B are each substantially the same as or similar to solar row 111 of FIG. 1. Each solar row includes rails 112, 113 (referred to as rails or profiles 112a and 112b in FIG. 7). Only rail or profile 112a and 112b are shown in FIG. 7. Rails or profiles 113a and 113b, corresponding to rail 113 in FIG. 1, are not shown in FIG. 7.

FIG. 7 illustrates in detail an apparatus to clean multiple solar panel rows combined with elements that were already described with reference to FIGS. 1-6. Therefore, not all elements from the basic system of FIGS. 1-6 will be described or mentioned.

The main frame 311 of the system of FIG. 7 is mounted on four wheels 312 (various numbers of wheels can be used) which roll on two rails 313 (only one rail is shown in FIG. 7) that are directed perpendicularly to the solar rows of the solar park. Two rails 313 are the preferred number of rails, but any number of rails can be used, or other types of paths such as concrete paths or the like can be used. Main frame 311 carries a cleaning apparatus as described in FIGS. 1-6. A driving mechanism 320 drives the main frame 311 two directions along the rails 313. Supporting frames 314, 315 are mounted on main frame 311 and an electrical piston 316 is connected to supporting frames 314 and 315. Changing the position (i.e., extension) of piston 316 will change the height of the axle point 322. Piston 316 can be a hydraulic piston or a cable winch. The upper frame 318 is connected through an axle 322 to the supporting frames 314 and 315. The axle point 322 allows the upper frame 318 to change its angle relative to the main frame 311. Another electrical piston 317 changes the angular position of upper frame 318 relative to main frame 311. Piston 317 can be a hydraulic piston or a cable winch. Profiles 2112 and 2113 can be aligned with the profiles 112 and 113 of the solar rows, respectively.

A control unit 319 controls the position of the system in three dimensions relative to the solar rows A and B. The input data to control unit 319 can be provided by sensors and encoders that are well known in the industry and are not described here. An electrical power supply such as batteries or an external electricity power supply is not described here. Elements 111a, 112a and 111b, 112b are profiles or rails of the solar rows A and B, respectively, of the solar park, and correspond respectively to rails 112, 113 of FIG. 1.

At the starting position, the cleaning system of the present invention is stationed on the profiles 2112 and 2113 of the system of FIG. 7. The profiles 2112 and 2113 are in line with the profiles 112a and 113a (i.e., rails 112, 113 of FIG. 1) of the solar row A. Upon receiving a start cleaning command, the cleaning system moves from profiles 2112 and 2113 toward profiles 112a and 113a, respectively, to engage the profiles (rails) 112a and 113a (rails 112 and 113), and the cleaning cycle of solar row A starts. This cleaning cycle has been described herein with reference to FIGS. 1-6. Once the cleaning cycle is completed, the system of FIGS. 1-6 moves backward from profiles 112a and 113a toward profiles 2112 and 2113 of the FIG. 7 system, until the whole cleaning apparatus is stationed back on profiles 2112 and 2113.

At this stage, the control unit 319 provides a command to the driving mechanism 320 and the system of FIG. 7 moves on the rails 313 from solar row A toward solar row B. When the system of FIG. 7 arrives close to solar row B, the sensors and the encoders of the FIG. 7 system transfer to the control unit 319 accurate data regarding the relative position between the FIG. 7 system and the solar row B. The control unit 319 processes the data and provides operating commands to driving mechanism 320, and to pistons 316 and 317. The system in FIG. 7 changes its horizontal, height and angular positions until the profiles 2112 and 2113 are aligned with 112b and 113b, respectively (i.e., rails 112 and 113 of solar row B). The start cleaning command is then given and the cleaning system moves from profiles 2112 and 2113 toward profiles 112b and 113b, and the cleaning cycle of solar row B starts, as described herein with reference to FIGS. 1-6. The above-described process can be repeated for any number of solar rows.

An important, main advantage of the system of FIG. 7, and method for its use, is that a single cleaning system can clean multiple solar rows and, in turn, significantly reduce the cleaning cost per row. Additionally, as the system is not stationary in a given location, it can provide more flexibility as far as the real estate space next to the rows is concerned.

The embodiments of the invention described above provide several advantages. Among others, one or more of the embodiments provide a system and a method that will make solar panel cleaning simple, efficient, and which could optionally not use water. Also, a system and method are disclosed that will make the solar panel cleaning process automatic and economical. Even further, a system for cleaning solar panels is provided that requires minimal maintenance and supervision with low construction cost.

The invention also provides a solar panel cleaning system and method that could achieve high quality cleaning along with a high level of reliability in all weather and topographic conditions. The system is even adaptable to existing as well as newly built solar parks and solar installations.

Figure 8:
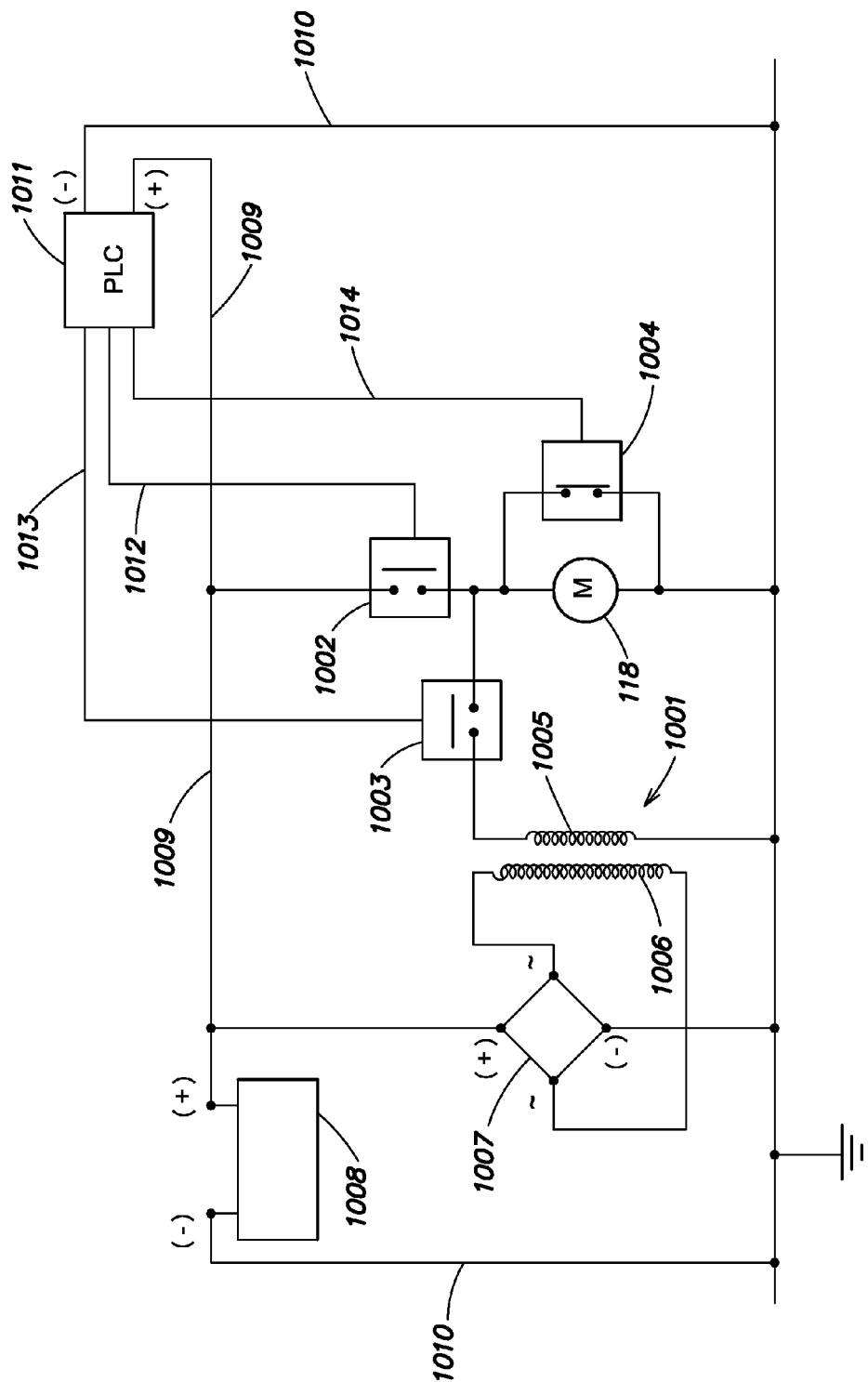
FIG. 8 shows in detail an electrical system of the present invention, which operates the core system(s) shown in FIGS. 1-7.

Referring now to FIG. 8, an electrical system of the present invention is shown which operates the core system(s) shown in FIGS. 1-7, described above. For this electrical system, the drive system 118 drives winch cylinder 130, and cables 131 that are winding on the winch cylinder 130 which, in turn, enable the secondary frame, referred to now as a mobile cleaning section 136, to move upward. When the mobile cleaning section 136 moves downward by the force of gravity, the cables 131 unwind from the winch cylinder 130 and the unwinding rotation of the winch cylinder 130 causes the DC motor 118 to rotate accordingly. Drive system 118 includes either one DC motor or several DC motors in parallel electrical connection. DC drive system 118 operates as a motor when the mobile cleaning section 136 moves upward and operates as a DC generator when mobile cleaning section 136 descends.

Elements 1002, 1003 and 1004, are Electronic Switching Devices (hereinafter the "ESD") that can be a solid state relay, an electro mechanical relay, a power transistor, a MOSFET, end other electronic switching devices; all these mentioned devices are very well known in the industry and therefore they will not be described. ESD 1002 is a normally open ESD (hereinafter "N.O."). ESD 1003 is a N.O. ESD. ESD 1004 is normally closed ESD (hereinafter "N.C."). Element 1001 is a transformer, wherein 1005 is a primary coil of the transformer 1001 and 1006 is a secondary coil of the transformer 1001. Transformer 1001 is constructed as a voltage increaser transformer (i.e., {output voltage/input voltage}>1). Element 1007 is a conventional bridge rectifier that converts the output AC voltage of secondary coil 1006 to a DC voltage which is higher than the battery DC voltage. Element 1008 is the electrical system's battery, preferably a 12 or 24 volt battery (any other battery can be used). Element 1009 is the positive electricity conductive line. Element 1010 is the negative conductive line. Element 1011 is a Programmable Logic Controller (hereinafter "PLC").

The PLC 1011 receives inputs and produces outputs in the forms of "on"-"off", or in the form of Pulse Width Modulation. Pulse Width Modulation (hereinafter "PWM") which is known in the industry as PWM output means that the output is in the form of square waves where the frequency and the ratio between the pulse width and the wave full cycle can be predetermined and modulated. The PLC 1011 is a well-known device in the industry and therefore, will not be described in detail. ESD's 1012, 1013 and 1014 are the lines that are transmitting the PLC signals to the ESDs 1002, 1003 and 1004 respectively.

Operation of the electrical system shown in FIG. 8 is as follows:

Upward motion phase: in this phase, the N.C. ESD 1004 receives an "on" signal from the PLC 1011 and opens, i.e., disconnects its contacts; ESD 1003 receives no signal and remains open, i.e., with its contacts disconnected; and ESD 1002 receives an "on" signal from the PLC, i.e., to cause its contacts to contact one another. The DC drive system 118 is now connected to the battery power supply which causes the motor(s) of the DC drive system 118 to rotate and to pull the mobile cleaning section 136 upward. The effective DC voltage on the motor 118 can be controlled by Pulse Width Modulation (PWM) to ESD 1002 from the PLC (controlling the voltage on the motor(s) of drive system 118, is controlling the motor speed).

Downward motion with battery charging phase: in this phase, ESD 1004 is still open; ESD 1002 receives no signal and its contacts are disconnected; the motor of the DC drive system 118 is driven by the force of gravity pulling the mobile cleaning section 136 downward, and operates as a DC generator; ESD 1003 receives a predetermined PWM from the PLC 1011. The pulses given by the PLC 1011 to ESD 1003 cause the circuit that includes the drive system 118, the ESD 1003, and the primary coil 1005 of the transformer 1001, to be switched closed and open in the frequency and duration of the PWM.

The outcome of the described switching is a type of distorted square wave through drive system 118 and the primary coil 1005. The current through primary coil 1005 induces AC voltage through the secondary coil 1006. The induced voltage on coil 1006 passes to the bridge rectifier 1007. The output of the bridge rectifier 1007 is a DC voltage that is higher than the battery voltage and, therefore, can charge the battery 1008.

The descending speed of the mobile cleaning section 136 is controlled by the breaking force of drive system 118. The breaking force of drive system 118 is proportional to the impedance load that is connected to drive system 118; the impedance depends on the PWM, on the electrical characteristics of the transformer 1001 and on the voltage of the battery 1008. Experimental parameters: PWM=5/20; meaning cycle=20 milli seconds, and therefore Frequency=50 Hz, and the pulse width=5 milli seconds. These parameters are examples only and other characteristics can be used.

It is to be understood that the present invention is not limited to the disclosed embodiments and the characteristics described above, but includes any and all embodiments that use any types of Electrical Switching Devices triggered by pulses, in combination with DC motor/generator output that is transferred to a transformer in order to control descending speed of a cleaning apparatus and/or charging of battery, using the transformer output.

Figure 9:
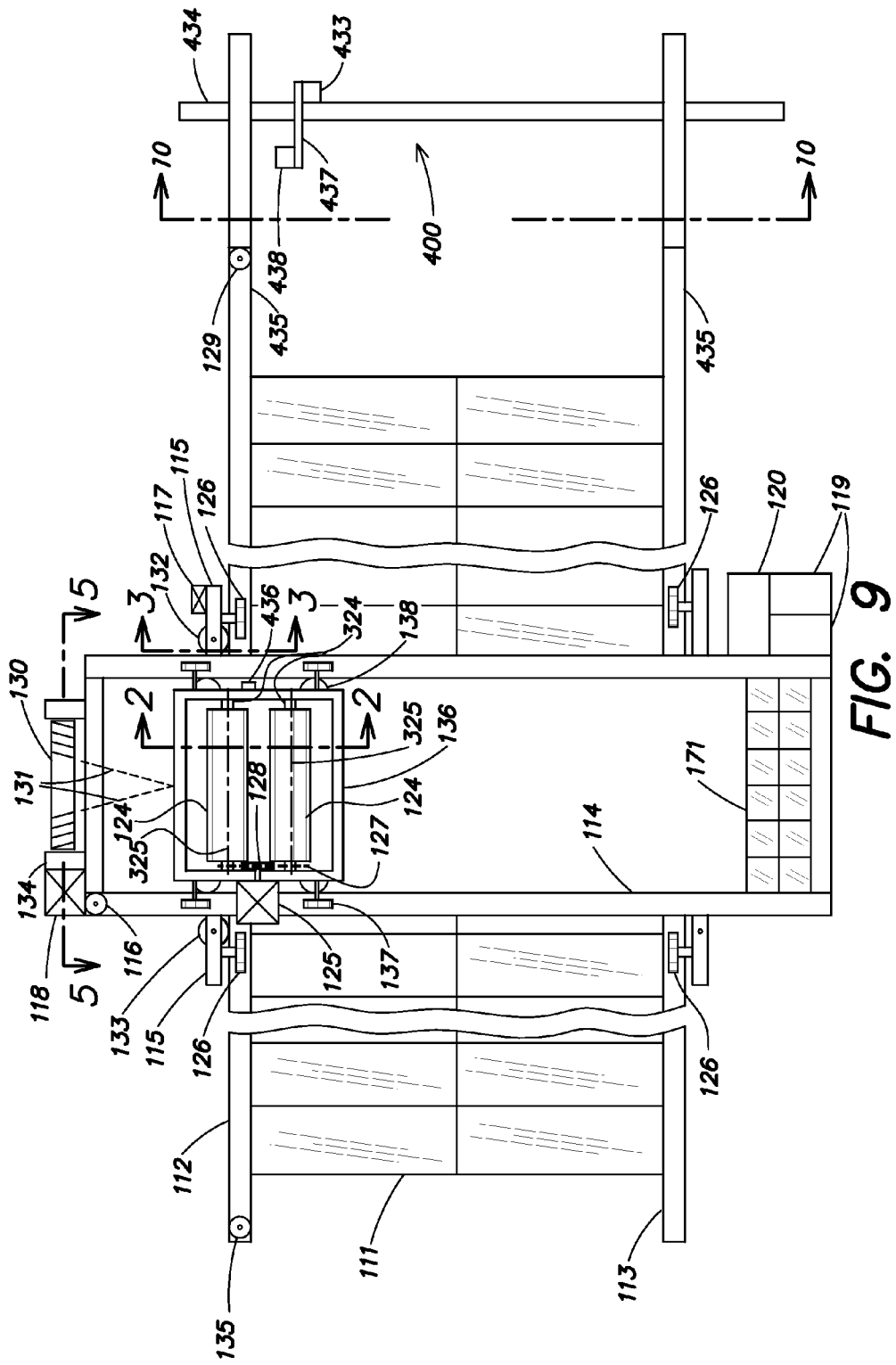
FIG. 9 is a top view of an embodiment of a solar panel cleaning system shown in an operative position with a solar array, and including an extension, a docking station and locking elements of a docking and locking system of the invention.

FIG. 9 is a top view of another embodiment of a cleaning system of the present invention, and a number of parts are identical to those shown in FIG. 1 and described above. However, instead of solar panels 171 being situated outside of the main frame 114 as shown in FIG. 1, they are situated within the periphery of the main frame 114. More specifically, the solar panels 171 may be attached to the lowermost horizontal part of the main frame 114 and/or to one or both of the vertical parts of the main frame at their lower sections. An advantage of the placement of the solar panels 171 within the periphery of the main frame 114 is that they can be cleaned during the downward movement of the cleaning system, i.e., by the rotation of RCA's 124.

Additionally, the horizontal driving wheel 132 is situated at the upper section of the system to roll along the upper rail 112, the motion sensor 134 is embodied as a vertical encoder attached to the winch cylinder 130 and/or motor 118 or more generally to the actuator that moves the mobile cleaning system 136, and sensors 129 and 135 are at opposite positions on the upper rail 112 relative to the embodiment shown in FIG. 1. Encoder 134 provides data about the position of the mobile cleaning system 136 to the control unit 120.

The embodiment shown in FIG. 9 includes a docking and locking system that serves to dock and lock the mobile cleaning system 136 to prevent a strong wind gust from moving the mobile cleaning system and potentially damaging the solar array. The docking and locking system includes an extension 400 that is attached to the solar array and defines a docking station for the mobile cleaning system 136. The cleaning system 136 may be docked in the docking station defined by the extension 400 most of the time, e.g., when not in use, and thus does not shadow any part of the solar array. This improves energy generation. The docking position is placed on the extension (400) at a station that is beyond the horizontal plane of the solar row (111).

Figure 13:
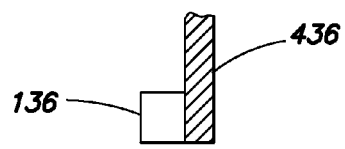
FIG. 13 is a view taken along the line 13-13 in FIG. 11.

Extension 440 includes upper and lower rails 435 on which the cleaning system moves out from the docking station to the solar array and from the solar array to the docking system. Extension 440 also includes an angularly positioned supporting profile 434 (see FIGS. 9 and 10). Anchoring elements 437, 438 are attached to the extension construction through a connector element 433. Anchoring element 437 is a horizontal element while anchoring element 438 is positioned substantially perpendicularly to anchoring element 437. Another anchoring element 436 is attached to the mobile cleaning section 136 (i.e., secondary frame). Anchoring element 436 is positioned perpendicularly and upwardly on the mobile cleaning section 136 (see FIG. 13).

Figure 10:
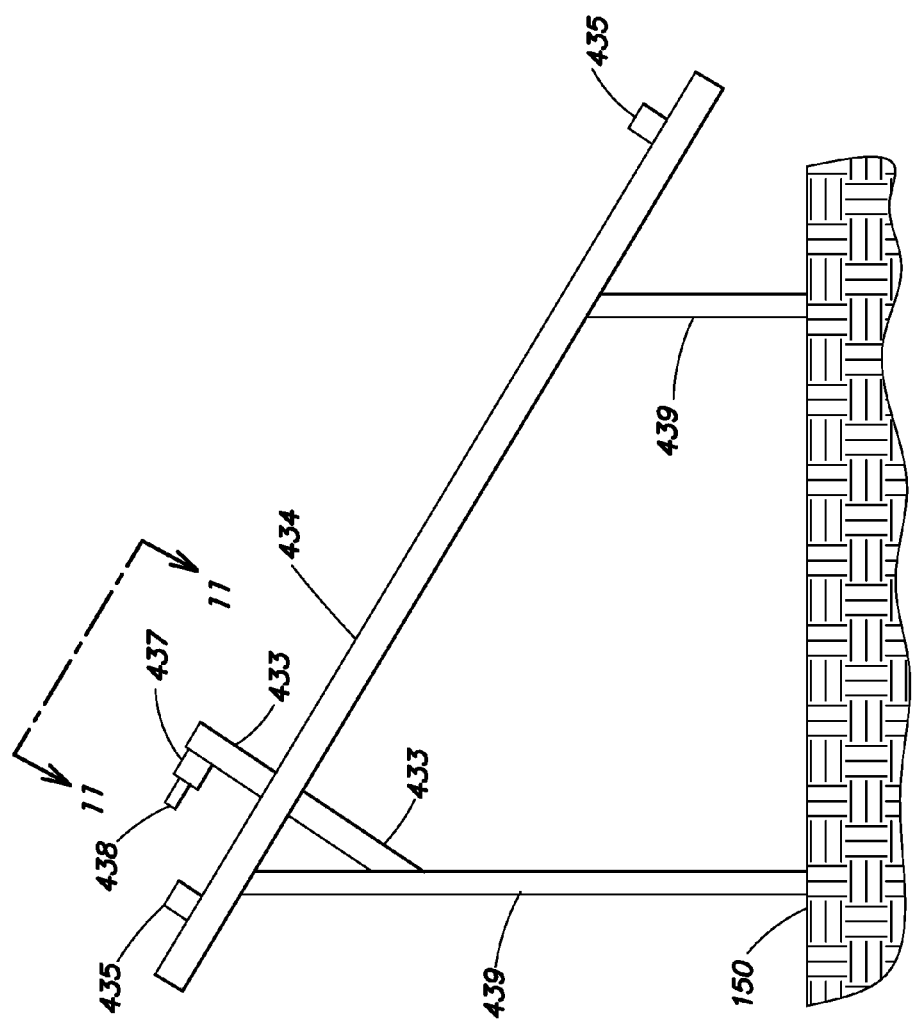
FIG. 10 is a side view taken along the line 10-10 of FIG. 9.

As shown in FIG. 10, profiles 439 support and connect the angular supporting profile 434 to a supporting surface, i.e., ground, for which ground level is represented as 150.

Figure 11:
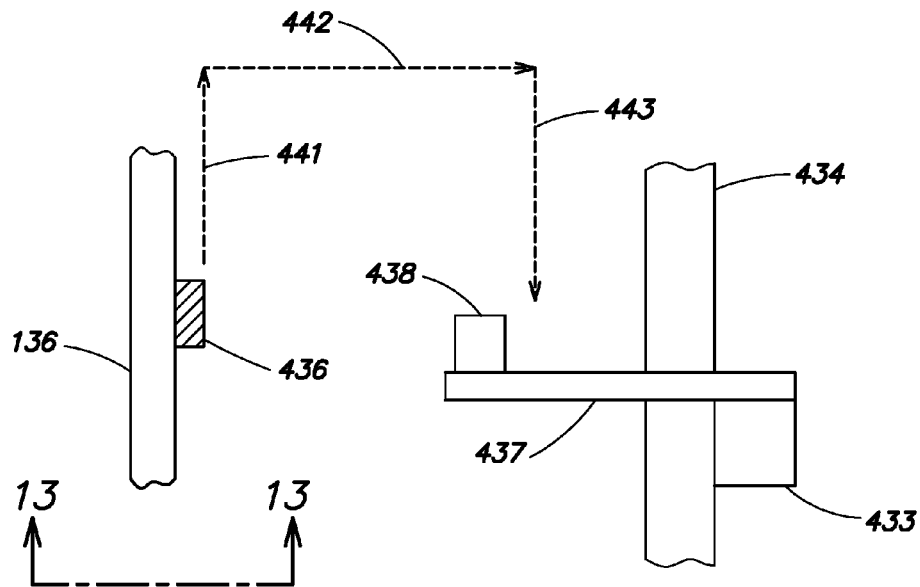
FIG. 11 is a detailed top view of the system along line 11-11 of FIG. 10 when the cleaning system is approaching the docking and locking position.
Figure 12:
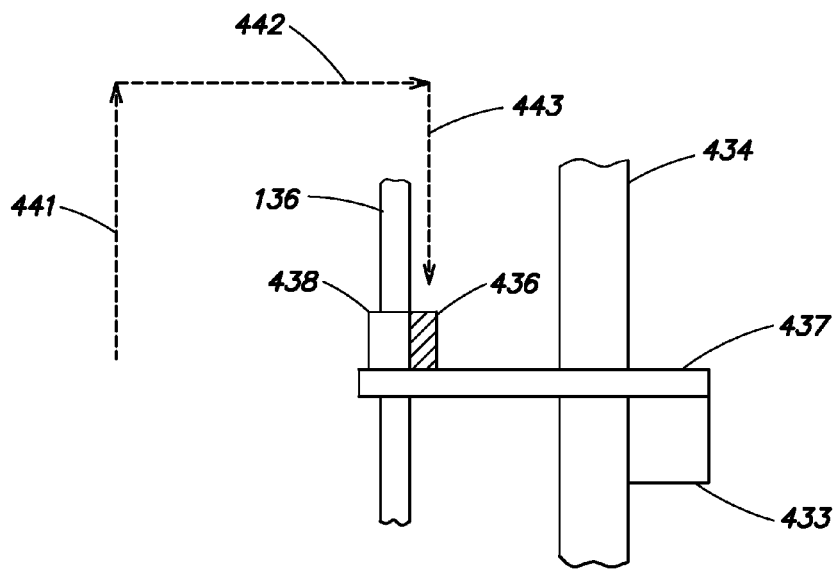
FIG. 12 is a detailed top view of the system along line 11-11 of FIG. 10 when the cleaning system is in the docking and locking position.

The mobile cleaning section 136, and thus the anchoring element 436 attached thereto, is controlled to move in a docking and locking path represented by the dashed lines in FIGS. 11 and 12. This docking and locking path includes an upward motion path 441, a following horizontal motion path 442 and then a downward motion path 443 at the end of which the mobile cleaning section and anchoring element 436 will be in a docking and locking position (see FIG. 12).

The docking and locking of the mobile cleaning system 136 is as follows.

The mobile cleaning system 136 starts to clean the solar panels of the solar array from right to left (for the embodiment shown in FIG. 9). When the mobile cleaning system 136 approaches sensor 135 at the left end of the upper rail 112, the mobile cleaning system 136 changes direction and starts to clean from left to right (as described above and in the other applications incorporated by reference herein). When the mobile cleaning system 136 approaches sensor 129 at the right end of the upper rail 435, the control unit 120 receives the signal and starts a pre-programmed docking mode.

The docking mode includes three movements, each pre-programmed. The first movement is an upward movement to a certain distance that is measured by the vertical encoder 134 (path 441), the second movement is a horizontal movement to a certain distance that is measured by a horizontal encoder of the drive system 117 (path 442), and the third movement is a vertically downward movement until the anchoring element 436 rests on the anchoring element 437 (path 443). In some cases, the vertical and horizontal movements can be partially or fully combined, i.e., an angled or slanted movement. The weight of the cleaning system 436 and the downward force of gravity enhance the vertical locking.

Since the mobile cleaning system 136 is connected to anchoring element 436, and anchoring elements 437 and 438 are connected to the extension construction (elements 433, 434, 439), the mobile cleaning system 136 is locked horizontally and vertically. The mobile cleaning system is unable to move horizontally or vertically.

Horizontally locking is important because it eliminates the possibility of the cleaning system drifting toward the solar array by wind or by the solar array slope. If the system would drift and would shadow the solar panels of the solar array, the electricity generating by the solar panel would be reduced dramatically.

Vertically locking is important because it releases the load and the stress from the conductive cable 131 for most hours of the day.

To initiate the cleaning process by the mobile cleaning system 136 from the docking station, when the system receives a start cleaning command, the control unit 120 initiates an "out of docking mode". This mode is preprogrammed and includes two movements, each preprogrammed. The first movement is an upward movement to a certain distance that is measured by the vertical encoder 134 (reverse to path 443), and the second movement is a horizontal movement to a certain distance that measured by the horizontal encoder (reverse to path 442). When the second movement has been completed, the system is ready to start the cleaning process. In some cases, the vertical movement and the horizontal movement can be fully or partially combined, i.e., an angled or slanted movement In some cases, the force of a head wind will create resistance to the docking process or to the "out of docking" process. In such cases, the control unit 120 can be designed or programmed to increase the power of one or both motors. Reading of the head wind resistance can be made by reading the rates of the pulses from the vertical and horizontal encoders, that provide data about the position of the mobile cleaning system 136, or by signals that can be received from one or more wind measuring devices in proximity to the solar row. The pulse rates from the encoders will vary depending on the wind and other forces applied to the mobile cleaning system 136. As the head wind increases, the rotations of the encoders will slow down, so the pulses will be farther apart in time. The pulse variations can be measured and the control unit 120 can then increase the power to one or both of the driving motors as required to effect the docking process or the out of docking process.

When the docking or the out of docking process has not been accomplished, a repeat process can be initiated by the control unit 120. That is, the control unit 120 is configured to repeatedly attempt movement of the mobile cleaning system 120 to the docking position until it is determined to be in the docking position.

Although FIG. 9 shows a single row of solar panels, the disclosed docking and locking system may be used for a multi-row solar array.

The docking and locking techniques described above are not limited to the disclosed and illustrated embodiments and the characteristic described above, but include all docking solutions that causing anchoring elements on the mobile solar cleaning system and anchoring elements on a stationary construction, to be engaged and to cause the cleaning system to be locked horizontally and vertically are considered to be within the scope and spirit of the invention.

Additional disclosure about solar panel cleaning systems that may be used in combination with the invention is found in U.S. patent application Ser. No. 13/917,285 filed Jun. 13, 2013, U.S. patent application Ser. No. 13/751,903, filed Jan.

28, 2013, now U.S. Pat. No. 8,500,918, and U.S. provisional patent application Ser. Nos. 61/647,010 filed May 15, 2012, 61/663,827 filed Jun. 25, 2012, 61/725,280 filed Nov. 12, 2012, 61/819,107 filed May 3, 2013, and U.S. patent application Ser. No. 14/243,796 filed Apr. 2, 2014 (claiming priority from U.S. Provisional patent application Ser. No. 61/871,017). The entire contents of all of these applications are incorporated by reference herein.

It is to be understood that the present invention is not limited to the embodiments described above, but includes any and all embodiments within the scope of the following claims. While the invention has been described above with respect to specific apparatus and specific implementations, it should be clear that various modifications and alterations can be made, and various features of one embodiment can be included in other embodiments, within the scope of the present invention. It is to be understood that the present invention is not limited to the embodiments described herein.

The invention claimed is:

1. A solar panel row cleaning system with a two directional locking mechanism, the solar row being inclined and having an upper end and a lower end in a width direction, the cleaning system comprising:
  a support construction for supporting the solar row;
  a movable main frame movable in a length direction of the solar row;
  at least one cleaning apparatus mounted on said main frame and movable in the width direction of the solar row;
  a first anchoring element attached to said at least one cleaning apparatus;
  at least a first actuator for moving said at least one cleaning apparatus in the width direction;
  at least a second actuator for moving said main frame in the length direction;
  a control unit for controlling said first actuator to cause controlled movement of said at least one cleaning apparatus in the width direction and for controlling said second actuator to cause controlled movement of said main frame in the length direction; and
  an extension extending from said support and including a second anchoring element, said at least one cleaning apparatus being movable from an operative position over the solar row to a docking position on said extension and beyond said solar row,
  said control unit being configured to move said at least one cleaning apparatus to cause said first and second anchoring elements to engage with one another when in the docking position and thereby lock said at least one cleaning apparatus preventing its movement in horizontal and downward directions.

2. The cleaning system of claim 1, wherein when in the docking position, movement of said at least one cleaning apparatus downward in the width direction of the solar row and movement of said at least one cleaning apparatus horizontally in the length direction of the solar row are prevented.

3. The cleaning system of claim 1, further comprising an encoder attached to said first actuator for providing data about position of said at least one cleaning apparatus.

4. The cleaning system of claim 1, wherein said control unit is configured to move said at least one cleaning apparatus in a preprogrammed path into the docking position and out from the docking position.

5. The cleaning system of claim 4, wherein the preprogramed path into the docking position includes an upward movement, a following horizontal movement and a following downward movement, and the preprogrammed path out from the docking position includes an upward movement and a following horizontal movement.

6. The cleaning system of claim 1, further comprising encoders for providing data about position of said at least one cleaning system, said control unit being configured to calculate the position of said at least one cleaning system in the width direction and in the length direction based on outputs of said encoders.

7. The cleaning system of claim 1, wherein said control unit is configured to adjust power to said first and second actuators, whereby power is increased by said control unit to said first and second actuators in the presence of a strong head wind.

8. The cleaning system of claim 1, wherein said control unit is configured to repeatedly attempt movement of said at least one cleaning apparatus to the docking position until said at least one cleaning apparatus is determined to be in the docking position.

9. The cleaning system of claim 1, wherein said at least a first actuator includes a motor, further comprising an encoder attached to said motor for providing data about position of said at least one cleaning apparatus.

10. The cleaning system of claim 1, wherein said at least a first actuator includes a winch cylinder, a motor that rotates said winch cylinder and at least one cable attached to said winch cylinder and to said at least one cleaning apparatus, further comprising an encoder attached to said motor for providing data about position of said at least one cleaning apparatus.

11. The cleaning system of claim 1, wherein said at least a first actuator includes a winch cylinder, a motor that rotates said winch cylinder and at least one cable attached to said winch cylinder and to said at least one cleaning apparatus, further comprising an encoder attached to said winch cylinder for providing data about position of said at least one cleaning apparatus.

12. The cleaning system of claim 1, wherein said at least one cleaning apparatus includes a frame, said first anchoring element being attached to said frame on a side closest to said extension.

* * * * *